(12) United States Patent
Tian et al.

(10) Patent No.: US 12,531,587 B2
(45) Date of Patent: Jan. 20, 2026

(54) COMMUNICATION CHIP

(71) Applicant: RDA Microelectronics (Beijing) Co., Ltd., Beijing (CN)

(72) Inventors: Zhen Tian, Beijing (CN); Ka Man Wong, Beijing (CN); Hongyu Tian, Beijing (CN); Yong Li, Beijing (CN); Xianjin Wang, Beijing (CN); Yujiao Cui, Beijing (CN); Guoli Zhou, Beijing (CN)

(73) Assignee: RDA Microelectronics (Beijing) Co., Ltd., Beijing (CN)

( * ) Notice: Subject to any disclaimer, the term of this patent is extended or adjusted under 35 U.S.C. 154(b) by 412 days.

(21) Appl. No.: 18/041,388

(22) PCT Filed: Jul. 30, 2021

(86) PCT No.: PCT/CN2021/109772
§ 371 (c)(1),
(2) Date: Feb. 10, 2023

(87) PCT Pub. No.: WO2022/033333
PCT Pub. Date: Feb. 17, 2022

(65) Prior Publication Data
US 2023/0299805 A1    Sep. 21, 2023

(30) Foreign Application Priority Data
Aug. 10, 2020  (CN) .......................... 202010797162.8

(51) Int. Cl.
*H04B 1/3805*    (2015.01)
*H04B 1/403*    (2015.01)

(52) U.S. Cl.
CPC .......... *H04B 1/3805* (2013.01); *H04B 1/406* (2013.01)

(58) Field of Classification Search
CPC ................................ H04B 1/805; H04B 1/406
See application file for complete search history.

(56) References Cited

U.S. PATENT DOCUMENTS

| | | | | |
|---|---|---|---|---|
| 2012/0033766 | A1* | 2/2012 | Hosokawa | H04B 1/10 375/350 |
| 2012/0184331 | A1* | 7/2012 | Rofougaran | H04B 1/406 455/556.1 |

(Continued)

FOREIGN PATENT DOCUMENTS

| | | |
|---|---|---|
| CN | 101047910 A | 10/2007 |
| CN | 101277484 A | 10/2008 |

(Continued)

OTHER PUBLICATIONS

International Search Report and Written Opinion received in the corresponding International Application PCT/CN2021/109772, mailed Oct. 21, 2021.

(Continued)

*Primary Examiner* — Brian P Cox
(74) *Attorney, Agent, or Firm* — Kilpatrick Townsend & Stockton LLP

(57) ABSTRACT

The present disclosure provides a communication chip, which is applied to a terminal device and includes a system control module, a radio frequency signal processing module, a first baseband processing module, and a second baseband processing module, where the system control module is respectively connected to the radio frequency signal processing module, the first baseband processing module and the second baseband processing module; the radio frequency signal processing module is further respectively connected to the first baseband processing module and the second baseband processing module.

17 Claims, 6 Drawing Sheets

(56) References Cited

U.S. PATENT DOCUMENTS

2014/0219162 A1 8/2014 Eyuboglu et al.
2020/0344635 A1* 10/2020 Lu .................... H04W 28/0236

FOREIGN PATENT DOCUMENTS

| CN | 101925203 | A | 12/2010 |
| CN | 102333336 | A | 1/2012 |
| CN | 103716918 | A | 4/2014 |
| CN | 105812297 | A | 7/2016 |
| CN | 105992344 | A | 10/2016 |
| CN | 106849984 | A | 6/2017 |
| CN | 111865358 | A | 10/2020 |
| EP | 3094155 | A1 | 11/2016 |

OTHER PUBLICATIONS

First Office Action received in the corresponding Chinese Application 202010797162.8, mailed Jun. 23, 2021.
Second Office Action received in the corresponding Chinese Application 202010797162.8, mailed Dec. 16, 2021.
Third Office Action received in the corresponding Chinese Application 202010797162.8, mailed May 30, 2022.
Notice of Allowance received in the corresponding Chinese Application 202010797162.8, mailed Dec. 16, 2022.

* cited by examiner

COMMUNICATION CHIP

CROSS-REFERENCE TO RELATED APPLICATION

This application is a national stage of International Application No. PCT/CN2021/109772, field on Jul. 30, 2021, which claims priority to Chinese Patent Application No. 202010797162.8, filed to China National Intellectual Property Administration on Aug. 10, 2020 and entitled "Communication Chip". Both of the aforementioned applications are hereby incorporated by reference in their entireties.

TECHNICAL FIELD

The present disclosure relates to the technical field of chips, and in particular, to a communication chip.

BACKGROUND

At present, a mobile terminal (e.g., a smart phone, a tablet computer, etc.) usually includes a dual-mode communication chip packaged via system in a package (SIP) technology, and the dual-mode communication chip includes a global system for mobile communication (GSM) chip and a narrow band internet of things (NB-IoT) chip.

In the related art, the GSM chip in the mobile terminal supports a GSM communication mode, and the NB-IoT chip in the mobile terminal supports an NB-IoT communication mode, where the GSM chip and the NB-IoT chip each has a respective radio frequency processing module, a digital front-end module, a baseband processing module and a system module.

SUMMARY

The present disclosure provides a communication chip.

In a first aspect, the present disclosure provides a communication chip, which is applied to a terminal device and includes a system control module, a radio frequency signal processing module, a first baseband processing module, and a second baseband processing module, where, the system control module is respectively connected to the radio frequency signal processing module, the first baseband processing module and the second baseband processing module; and the radio frequency signal processing module is further respectively connected to the first baseband processing module and the second baseband processing module.

BRIEF DESCRIPTION OF THE DRAWINGS

In order to illustrate the embodiments of the present disclosure or the technical solutions more clearly, a brief description will be given below with reference to the accompanying drawings used in the description of the embodiments. It is obvious that the accompanying drawings described below are some of the embodiments of the present disclosure, and those of ordinary skill in the art may obtain other drawings according to these accompanying drawings without paying any creative effort.

DESCRIPTION OF EMBODIMENTS

In order to make the objects, technical solutions and advantages of the embodiments of the present disclosure clearer, the technical solutions in the embodiments of the present disclosure will be clearly and completely described in conjunction with the accompanying drawings of the embodiments of the present disclosures. Obviously, the described embodiments are merely a part of the embodiments of the present disclosure, but not all of the embodiments. Based on the embodiments of the present disclosure, all other embodiments obtained by those of ordinary skill in the art without paying any creative effort will fall within the protection scope of the present disclosure.

The terms "first", "second", "third", and "fourth", if any, in the description and/or claims as well as the above-mentioned accompanying drawings of the present disclosure are used for distinguishing between similar objects and not necessarily for describing a particular sequence or chronological order. Furthermore, the terms "includes" and "including", as well as any variations thereof, are intended to cover a non-exclusive inclusion, for example, a process, a method, a system, a product, or a device that includes a list of steps or elements is not necessarily limited to those steps or elements expressly listed, but may include other steps or elements not expressly listed or inherent to such process, method, product, or device.

Figure 1:
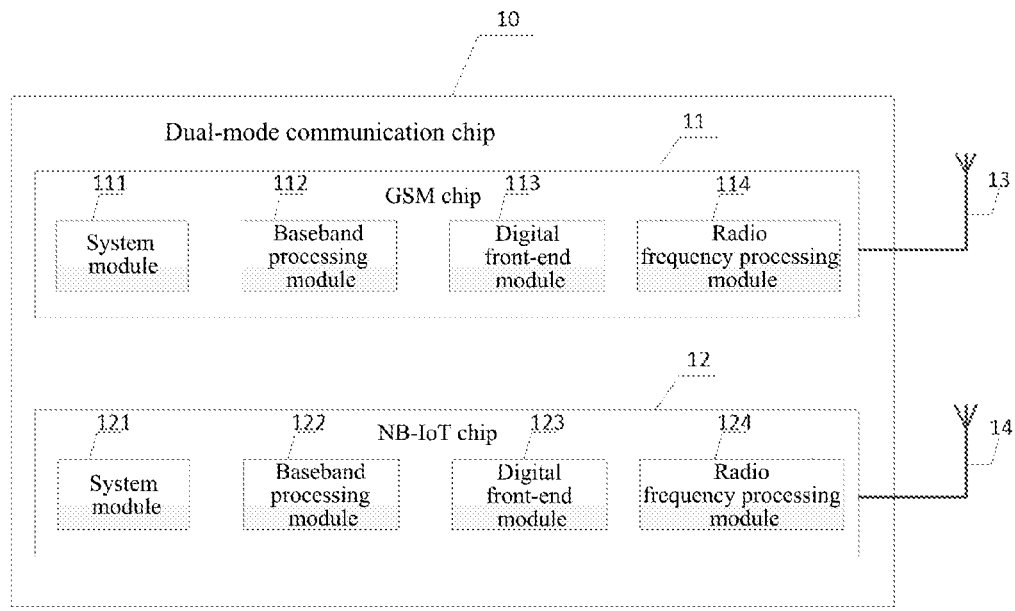
FIG. 1 is a schematic structural diagram of a dual-mode communication chip provided in the present disclosure.

FIG. 1 is a schematic structural diagram of a dual-mode communication chip provided in the present disclosure. As shown in FIG. 1, the terminal device includes: a dual-mode communication chip 10, a GSM antenna 13, and an NB-IoT antenna 14.

The dual-mode communication chip 10 includes a GSM chip 11 and an NB-IoT chip 12 which are packaged together. The GSM chip 11 includes: a system module 111, a baseband processing module 112, a digital front-end module 113, and a radio frequency processing module 114. The NB-IoT chip 12 includes: a system module 121, a baseband processing module 122, a digital front-end module 123, and a radio frequency processing module 124.

Specifically, a connection relationship and an operation method among the system module 111, the baseband processing module 112, the digital front-end module 113 and the radio frequency processing module 114 of the GSM chip 11, and those among the system module 121, the baseband processing module 122, the digital front-end module 123 and the radio frequency processing module 124 of the NB-IoT chip 12 will not be described here.

In the dual-mode communication chip 10, the GSM chip 11 and the NB-IoT chip 12 each has their respective system modules, baseband processing modules, digital front-end modules and radio frequency processing modules, causing a low integration level, a large area and high costs of the dual-mode communication chip 10.

In order to solve the problems of the low integration level, the large area and the high costs of the dual-mode communication chip 10 described above, the present disclosure provides a communication chip with a high integration level, a small area and low costs.

The mode communication chip shown in the present disclosure will be described below in detail with particular embodiments. It is to be noted that the following particular embodiments may be combined, and the like or similar contents will not be repeated in different embodiments.

Figure 2:
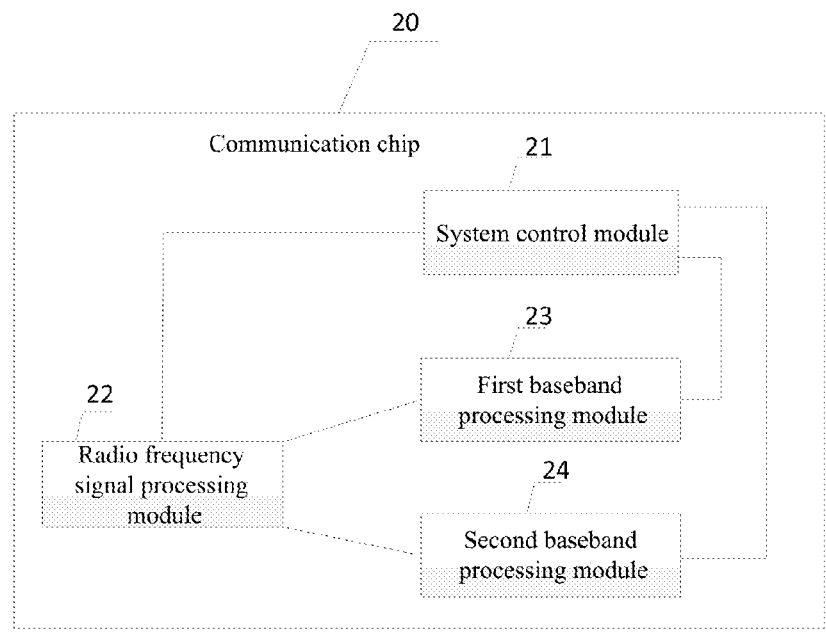
FIG. 2 is a first schematic structural diagram of a communication chip provided in the present disclosure.

FIG. 2 is a first schematic structural diagram of a communication chip provided in the present disclosure. The communication chip 20 provided in the present disclosure may be provided in a terminal device, such as a smart phone, a tablet computer, etc. As shown in FIG. 2, the communication chip 20 includes a system control module 21, a radio frequency signal processing module 22, a first baseband processing module 23, and a second baseband processing module 24, where, the system control module 21 is respectively connected to the radio frequency signal processing module 22, the first baseband processing module 23 and the second baseband processing module 24; and the radio frequency signal processing module 22 is further respectively connected to the first baseband processing module 23 and the second baseband processing module 24.

In an implementation, the system control module 21 may be configured to initialize the communication chip 20, perform task scheduling, data calculation, data storage, etc. In particular, reference may be made to the embodiment of FIG. 3, which will not be described in detail here.

In an implementation, the radio frequency signal processing module 22 may be configured to process a radio frequency analog signal received by an antenna to obtain a baseband input signal, and provide the baseband input signal to the first baseband processing module 23 or the second baseband processing module 24; or process the baseband output signal provided by the first baseband processing module 23 or the second baseband processing module 24 to obtain a radio frequency analog signal, and provide the radio frequency analog signal to the antenna.

In an implementation, the communication chip 20 may be configured to receive and process radio frequency analog signals and also generate and transmit radio frequency analog signals.

For example, when the communication chip 20 is configured to receive and process a radio frequency analog signal (including at least one of a GSM radio frequency analog signal and an NB radio frequency analog signal), the radio frequency signal processing module 22 may process the radio frequency analog signal received via the antenna to obtain a baseband input signal, and provide the baseband input signal to the system control module 21, and the first baseband processing module 23 or the second baseband processing module 24; and the first baseband processing module 23 and the second baseband processing module 24 may perform baseband processing on the baseband input signal.

For example, when the communication chip 20 is configured to generate and transmit a radio frequency analog signal (including at least one of a GSM radio frequency analog signal and an NB radio frequency analog signal), the first baseband processing module 23 or the second baseband processing module 24 may generate a baseband output signal and provide the baseband output signal to the radio frequency signal processing module 22; and the radio frequency signal processing module 22 may process the baseband output signal to obtain a radio frequency analog signal, and transmit the radio frequency analog signal via the antenna.

In a possible design, the first baseband processing module 23 is a narrow band internet of things baseband processing module, and the second baseband processing module 24 is a global system for mobile communication baseband processing module.

It is to be noted that the communication chip 20 provided in the present disclosure supports both a GSM communication mode and an NB-IoT communication mode, and may implement various combinations of the GSM communication mode and the NB-IoT communication mode, for example: an only GSM communication mode, or an only NB-IoT communication mode, or a GSM and NB-IoT communication mode, or a free-switch communication mode. Where the free-switch communication mode refers to a mode which switches freely between the GSM communication mode and the NB-IoT communication mode.

In practical application, since the communication chip 20 may implement various combinations of the GSM communication mode and the NB-IoT communication mode, the communication chip 20 can meet various needs of the users in mobile communication.

The communication chip provided in the present disclosure includes a system control module, a radio frequency signal processing module, a first baseband processing module, and a second baseband processing module, where the system control module is respectively connected to the radio frequency signal processing module, the first baseband processing module and the second baseband processing module; and the radio frequency signal processing module is further respectively connected to the first baseband processing module and the second baseband processing module. In the communication chip described above, the first baseband processing module and the second baseband processing module share the system control module and the radio frequency signal processing module, so that the integration level of the communication chip is improved, the area of the communication chip is reduced, and the costs of the communication chip are reduced.

Furthermore, since the first baseband processing module and the second baseband processing module share the system control module and the radio frequency signal processing module, the power consumption of the communication chip is lowered, the service life of the communication chip is pronged, and the practical applicability of the communication chip is improved.

On the basis of the above embodiment, the communication chip provided in the present disclosure will be further illustrated in connection with the embodiment of FIG. 3. Specifically, referring to the embodiment of FIG. 3.

Figure 3:
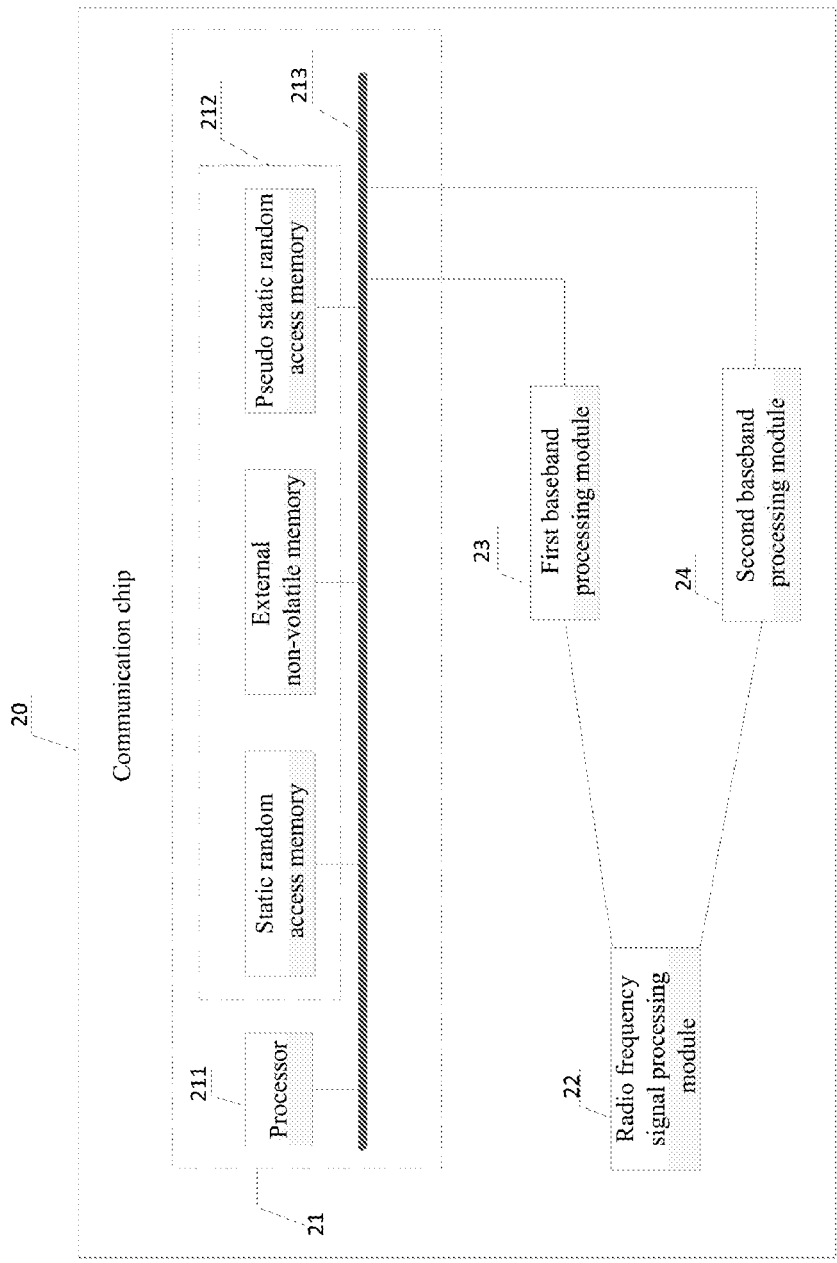
FIG. 3 is a second schematic structural diagram of a communication chip provided in the present disclosure.

FIG. 3 is a second schematic structural diagram of a communication chip provided in the present disclosure. On the basis of FIG. 2, as shown in FIG. 3, the system control module 21 includes: a processor 211, a storage module 212, and a control bus 213, where, the processor 211 and the storage module 212 are respectively connected to the control bus 213; and the control bus 213 is further respectively connected to the radio frequency signal processing module 21, the first baseband processing module 23 and the second baseband processing module 24.

In an implementation, the processor 211 includes a central processing unit (CPU) and a digital signal processor (DSP).

In the present disclosure, in either GSM communication mode or the NB-IoT communication mode, the CPU and the DSP may be shared by means of software defined radio (SDR), so as to improve the utilization of the CPU and the DSP.

In a possible design, the storage module 212 includes at least one of: a static random access memory (SRAM), an external non-volatile memory (Flash), and a pseudo static random access memory (PSRAM).

The SRAM can quickly respond to read/write operations and data storing operations of the CPU and the DSP, and the Flash can be used to store system codes and user data, etc.

In practical application, whether to set a PSRAM in the communication chip may be determined according to design requirements. When a PSRAM is provided in a communication chip, the PSRAM can store huge amounts of data, so that the SRAM is saved, the chip area is reduced, and the costs are reduced.

In the present disclosure, the DSP and the CPU share the SRAM, the PSRAM and the Flash to store baseband data in the GSM communication mode and/or the NB communication mode (for example, the above-mentioned baseband input signal or baseband output signal) or instructions, so that the use efficiency of the storage module 212 is improved.

In the communication chip provided in an embodiment of the present disclosure, the system control module includes: a processor, a storage module and a control bus, where the processor and the storage module are respectively connected to the control bus, and the control bus is further respectively connected to a radio frequency signal processing module, a first baseband processing module and a second baseband processing module. In the communication chip described above, the GSM communication mode and the NB-IoT communication mode share the system control module, so that the integration level of the communication chip is improved, the area of the communication chip is reduced, and the costs of the communication chip are reduced.

On the basis of the above embodiment, the communication chip provided in the present disclosure will be further illustrated in connection with the embodiment of FIG. 4. Specifically, referring to the embodiment of FIG. 4.

Figure 4:
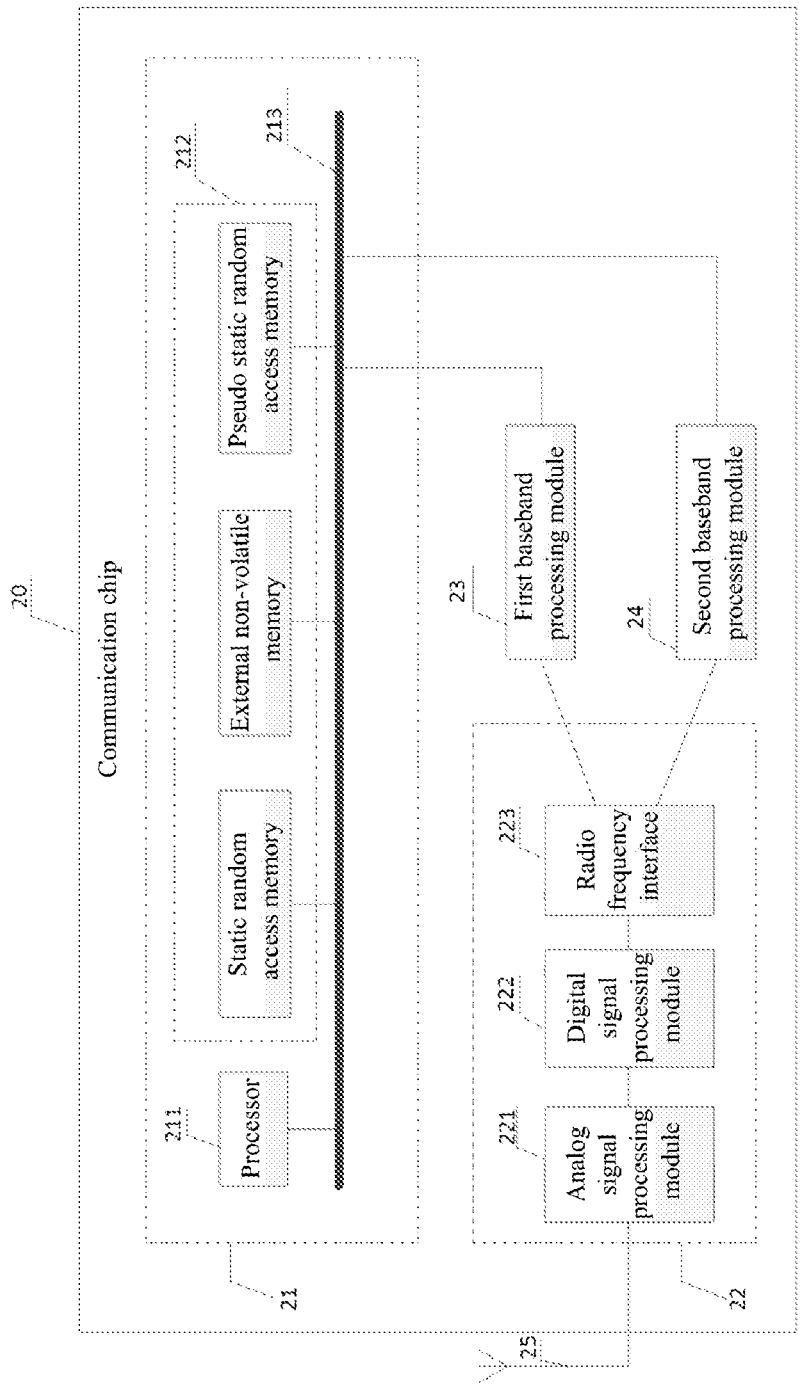
FIG. 4 is a third schematic structural diagram of a communication chip provided in the present disclosure.

FIG. 4 is a third schematic structural diagram of a communication chip provided in the present disclosure. On the basis of FIG. 3, as shown in FIG. 4, the radio frequency signal processing module 22 includes: an analog signal processing module 221, a digital signal processing module 222, and a radio frequency interface 223, where, the analog signal processing module 221 is connected to the digital signal processing module 222; and the radio frequency interface 223 is respectively connected to the digital signal processing module 222, the system control module 21, the first baseband processing module 23, and the second baseband processing module 24.

Specifically, the analog signal processing module 221 of the radio frequency signal processing module 22 is further connected to an antenna 25 of a terminal device, and the number of the antenna 25 is 1.

Compared with the dual-mode communication chip 10, the terminal device in the present disclosure includes one antenna 25, so that the number of the antenna used is reduced, and the costs of the terminal device are reduced.

Specifically, the radio frequency interface 223 is connected to the control bus 213 of the system control module 21.

In a process of the communication chip 20 receiving and processing a radio frequency analog signal, the analog signal processing module 221 may sequentially perform amplification, down-conversion, filtering and analog-to-digital conversion on the radio frequency analog signal received by the antenna 25 to obtain a digital signal, and provide the digital signal to the digital signal processing module 222; the digital signal processing module 222 may sequentially perform up-sampling, and frequency and phase adjustment on the digital signal to obtain a baseband signal, and provide the baseband signal to the radio frequency interface 223; and the radio frequency interface 223 may be configured to perform data structure integration on the baseband signal to obtain a baseband input signal, and provide the baseband input signal to the storage module 212 via the control bus 213, where the baseband input signal is used for signal verification.

In a process of the communication chip 20 generating and transmitting a radio frequency analog signal, the first baseband processing module 23 or the second baseband processing module 24 generates a baseband output signal, and provides the baseband output signal to the radio frequency interface 223; the radio frequency interface 223 performs inverse processing of data structure integration on the baseband output signal to obtain a baseband signal, and transmits the baseband signal to the digital signal processing module 222. The digital signal processing module 222 is configured to process the baseband signal to obtain a calibration signal, and provides the calibration signal to the analog signal processing module 221. The analog signal processing module 221 sequentially performs digital-to-analog conversion, filtering, up-conversion and power amplification on the calibration signal to obtain a radio frequency analog signal, and transmits the radio frequency analog signal via the antenna 25.

In the communication chip provided in the embodiment of the present disclosure, the radio frequency signal processing module includes: an analog signal processing module, a digital signal processing module and a radio frequency interface, where the analog signal processing module is connected to the digital signal processing module; and the radio frequency interface is respectively connected to the digital signal processing module, the system control module, the first baseband processing module and the second baseband processing module. In the above-mentioned communication chip, the first baseband processing module and the second baseband processing module share the radio frequency signal processing module, so that the integration level of the communication chip is improved, the area of the communication chip is reduced, and the costs of the communication chip are reduced.

Figure 5:
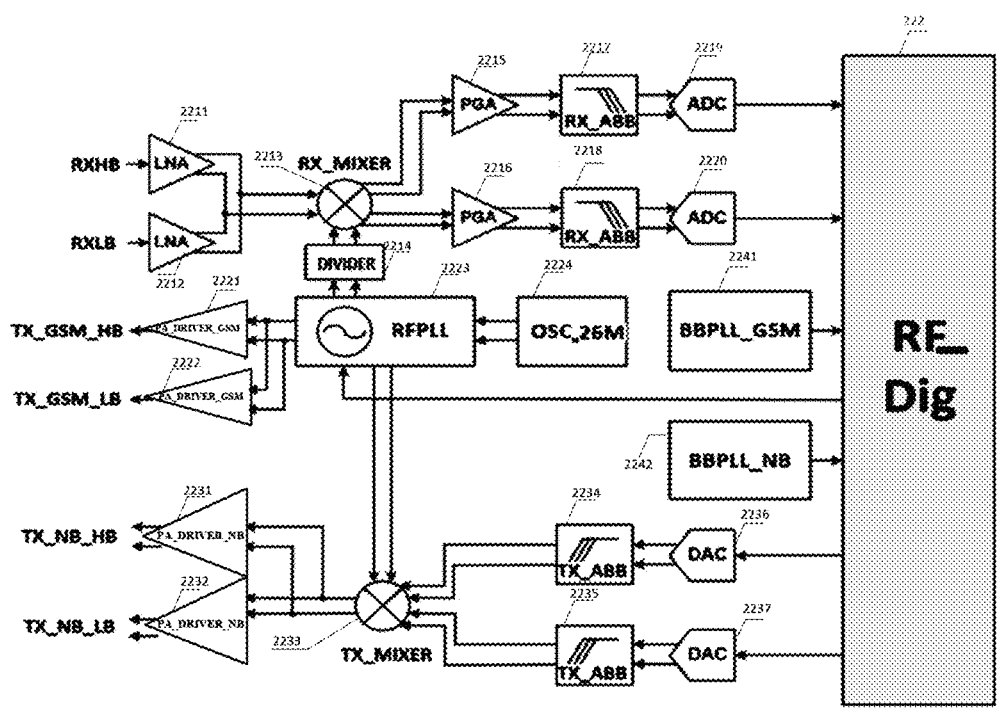
FIG. 5 is a schematic structural diagram of an analog signal processing module provided in the present disclosure.

FIG. 5 is a schematic structural diagram of an analog signal processing module provided in the present disclosure. As shown in FIG. 5, the analog signal processing module 221 includes: a receiving module, a transmitting module corresponding to the GSM communication mode, and a transmitting module corresponding to the NB-IoT communication mode.

In a possible design, the receiving module includes: low-noise amplifiers (LAN) 2211 and 2212, a receiving-end multiplier (RX MIXER) 2213, a frequency divider (DIVIDER) 2214, programmable gain amplifiers (PGA) 2215 and 2216, receiving-end filters (RX ABB) 2217 and 2218, and analog-to-digital converters (ADC) 2219 and 2220. Among then, relationships among the low-noise amplifiers 2211 and 2212, the receiving-end multiplier 2213, the frequency divider 2214, the programmable gain amplifiers 2215 and 2216, the receiving-end filters 2217 and 2218, and the analog-to-digital converters 2219 and 2220 are described with reference to the embodiment of FIG. 5, and will not be described here.

Specifically, the low-noise amplifiers 2211 and 2212 perform low-noise amplification on radio frequency analog signals received by the antenna 25 (taking two orthogonal GSM radio frequency analog signals as an example, where the two orthogonal GSM radio frequency analog signals are referred to as: RXHB and RXLB), where one low-noise amplifier 2211 performs low-noise amplification on one of the GSM radio frequency analog signals. The receiving-end multiplier 2213 and the frequency divider 2214 together are configured to perform down-conversion on signals after the low noise amplification. The programmable gain amplifiers 2215 and 2216 perform programmable gain amplification on the down-converted signals, where one programmable gain amplifier performs programmable gain amplification on one of the signals. The receiving end filters 2217 and 2218 perform filtering on the amplified signals, where one receiving end filter 2217 performs filtering on one of the amplified signals. The analog-to-digital converters 2219 and 2220 perform analog-to-digital conversion on the filtered signals to obtain digital signals, and provide the digital signals to the digital signal processing module (RF_Dig) 222, where one analog-to-digital converter performs analog-to-digital conversion on one of the filtered signals.

In the present disclosure, the receiving module can be used in both the GSM communication mode and the NB-IoT communication mode, so that the designed area of the chip is reduced, and the designed costs of the communication chip are reduced.

In a possible design, the transmitting module corresponding to the GSM communication mode includes: driver amplifiers (PA_DRIVER_GSM) 2221 and 2222, a radio frequency phase locked loop (FRPLL) 2223, and an oscillator (OSC_26M) 2224. Where the connection relationships among the driver amplifiers 2221 and 2222, the radio frequency phase locked loop 2223, and the oscillator 2224 are shown in FIG. 5, and will not be described here. It is to be noted that the oscillator 2224 is configured to generate a clock signal having a clock frequency of 26 mega (M).

Specifically, in the GSM communication mode, the radio frequency phase locked loop 2223 processes GSM calibration signals (including two orthogonal GSM calibration signals) of the digital signal processing module 222; and the driver amplifiers 2221 and 2222 perform power amplification on the calibration signals to obtain two orthogonal GSM radio frequency analog signals, and transmit the two orthogonal GSM radio frequency analog signals via the antenna 25 (referred to as: TX_GSM_HB and TX_GSM_LB, respectively).

In a possible design, the transmitting module corresponding to the NB-IoT communication mode includes: driver amplifiers (PA_DRIVER_NB) 2231 and 2232, a transmitting-end multiplier (TX_MIXER) 2233, transmitting-end filters (TX_ABB) 2234 and 2235, and digital-to-analog converters (DAC) 2236 and 2237. Where the connection relationships among the driver amplifiers 2231 and 2232, the transmitting-end multiplier 2233, the transmitting-end filters 2234 and 2235, and the digital-to-analog converters 2236 and 2237 are shown in FIG. 5, and will not be described here.

Specifically, in the NB-IoT communication mode, the digital-to-analog converters 2236 and 2237 perform digital-to-analog conversion on NB calibration signals (including two orthogonal NB calibration signals) from the digital signal processing module 222, where one digital-to-analog converter performs digital-to-analog conversion on one of the calibration signals. The transmitting-end filters 2234 and 2235 perform filtering on signals after digital-to-analog conversion, where one transmitting-end filter performs filtering on one of the signals after digital-to-analog conversion. The transmitting-end multiplier 2233 and the radio frequency phase locked loop 2223 are together configured to up-convert the filtered signals. The driver amplifiers 2231 and 2232 are configured to perform power amplification on the up-converted signal to obtain two orthogonal NB radio frequency analog signals, and transmit the two orthogonal NB radio frequency analog signals via the antenna 25 (referred to as: TX_NB_HB and TX_NB_LB, respectively).

Furthermore, the analog signal processing module 221 further includes: a GSM baseband phase locked loop (BBPLL_GSM) 2241 and an NB baseband phase locked loop (BBPLL_NB) 2242. Where the GSM baseband phase locked loop 2241 is configured to provide a clock for the second baseband processing module 24, and the NB baseband phase locked loop 2242 is configured to provide a clock the first baseband processing module 23.

On the basis of the above embodiment, the communication chip provided in the present disclosure will be further illustrated in connection with the embodiment of FIG. 6. Specifically, referring to the embodiment of FIG. 6.

Figure 6:
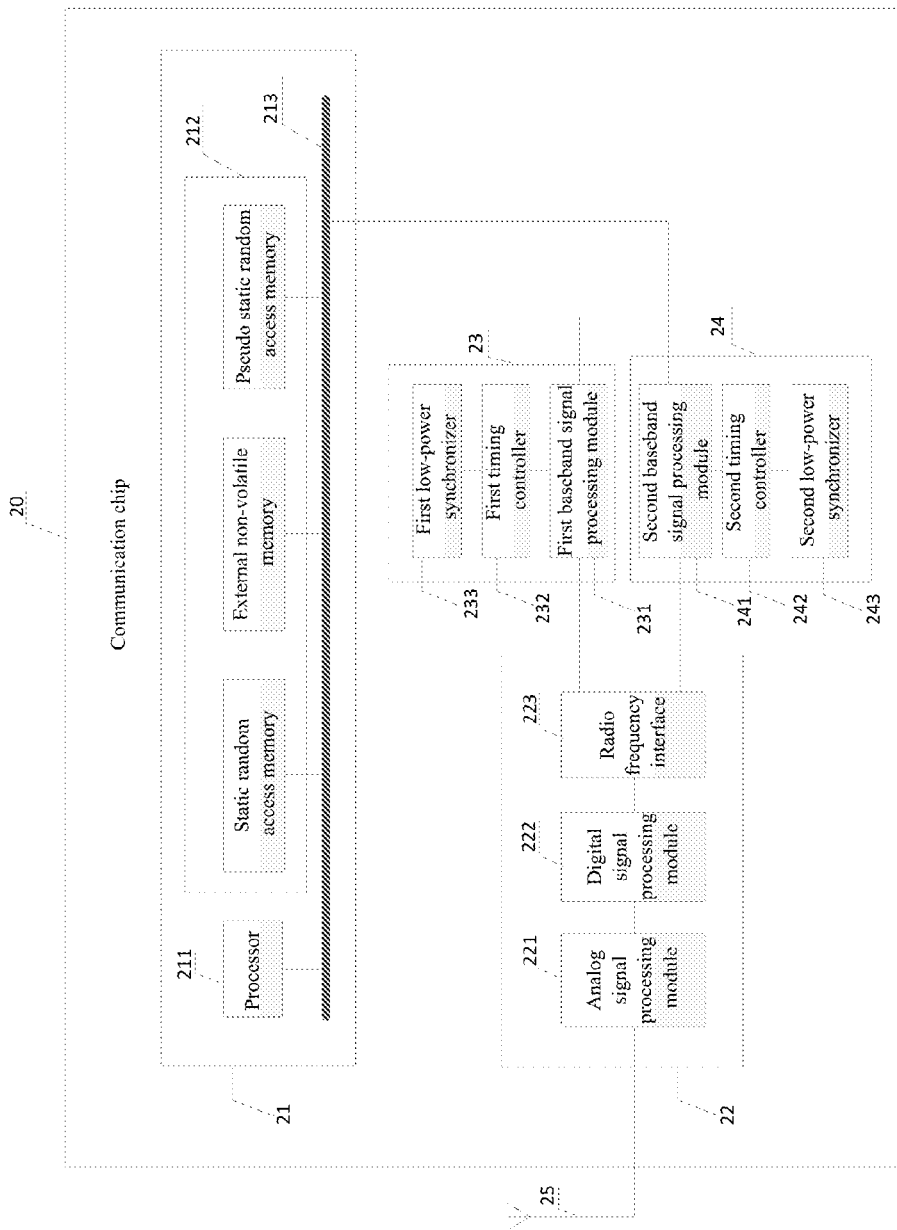
FIG. 6 is a fourth schematic structural diagram of a communication chip provided in the present disclosure.

FIG. 6 is a fourth schematic structural diagram of a communication chip provided in the present disclosure. On the basis of FIG. 4, as shown in FIG. 6, the first baseband processing module 23 includes: a first baseband signal processing module 231, a first timing controller 232, and a first low-power synchronizer 233, where, the first baseband signal processing module 231 is respectively connected to the system control module 21, the radio frequency signal processing module 22 and the first timing sequence controller 232; and
the first timing controller 232 is further connected to a first low-power synchronizer 233.

Specifically, the first baseband signal processing module 231 is respectively connected to the control bus 213 of the system control module 21, and the radio frequency interface 223 of the radio frequency signal processing module 22.

In an implementation, the first baseband signal processing module 231 is configured to track the transmitting time and the receiving time of signals in the NB-IoT communication mode. Where the first baseband signal processing module 231 includes: a receiver accelerator (RXACC) and a transmitter accelerator (TXACC).

In an implementation, the first timing controller 232 is configured to generate a frame interrupt and an event within a distributed inter-frame spacing during communication in the NB-IoT communication mode. The first low-power synchronizer 233 is configured to maintain timing using a clock having a frequency of 32 kHz.

The second baseband processing module 24 includes: a second baseband signal processing module 241, a second timing controller 242, and a second low-power synchronizer 243, where, the second baseband signal processing module 241 is respectively connected to the system control module 21, the radio frequency signal processing module 22 and the second timing sequence controller 242; and
the second timing controller 242 is further connected to a second low-power synchronizer 243.

Specifically, the second baseband signal processing module 241 is connected to the control bus 213 of the system control module 21, and the radio frequency interface 223 of the radio frequency signal processing module 22, respectively.

In an implementation, the second baseband signal processing module 241 is configured to track the transmitting time and the receiving time of signals in the GSM communication mode. Where the second baseband signal processing module 241 includes a receiving accelerator and a transmitting accelerator.

In an implementation, the second timing controller 242 is configured to generate a frame interrupt and an event within a distributed inter-frame spacing during communication in the NB-IoT communication mode. The second low-power synchronizer 243 is configured to maintain timing using a clock having a frequency of 32 kHz.

In the present disclosure, the first baseband processing module and the second baseband signal processing module have independent hardware accelerators (for example, the receiving accelerator and the transmitting accelerator), and there are also common hardware accelerators. Where the common hardware accelerators typically include: an accumulator, a multiplier, a multiplication accumulator, etc., and the common hardware accelerator can be used to reduce the computation load of the CPU.

In the communication chip provided in an embodiment of the present disclosure, the first baseband processing module includes: a first baseband signal processing module, a first timing controller, and a first low-power consumption synchronizer, where the first baseband signal processing module is respectively connected to the system control module, the radio frequency signal processing module and the first timing controller. The first timing controller is further connected to the first low-power synchronizer. The second baseband processing module includes: a second baseband signal processing module, a second timing controller and a second low-power consumption synchronizer, where the second baseband signal processing module is respectively connected to the system control module, the radio frequency signal processing module and the second timing controller. The second timing controller is further connected to the second low-power synchronizer. In the above-mentioned communication chip, the first baseband processing module includes the first low-power consumption synchronizer, and the second baseband signal processing module includes the second low-power consumption synchronizer. The first low-power consumption synchronizer or the second low-power consumption synchronizer enables the communication system in the communication chip to be powered down, reduce frequency, or the like, and also enables the communication system to keep frame synchronization after being woken up, thereby minimizing the power consumption of the communication chip in an extended discontinuous reception mode (Extended DRX, eDRX).

On the basis of the above embodiment, the communication chip provided in the present disclosure will be further illustrated in connection with the embodiment of FIG. 7. Specifically, referring to the embodiment of FIG. 7.

Figure 7:
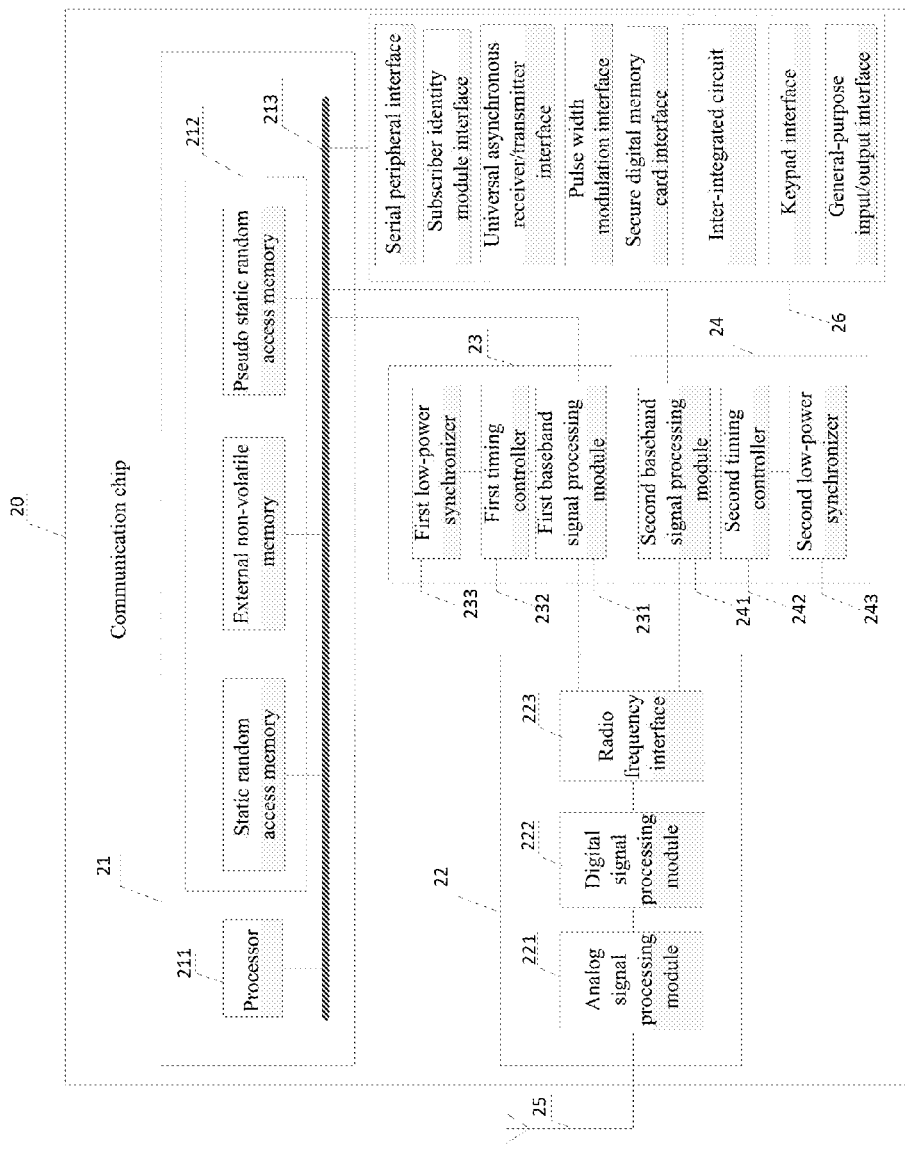
FIG. 7 is a fifth schematic structural diagram of a communication chip provided in the present disclosure.

FIG. 7 is a fifth schematic structural diagram of a communication chip provided in the present disclosure. On the basis of FIG. 6, as shown in FIG. 7, the communication chip further includes: an external interface module 26, where the external interface module 26 is connected to the system control module 21.

Specifically, the external interface module 26 is connected to the control bus 213 of the system control module 21.

The external interface module 26 includes at least one of: a serial peripheral interface (SPI), a subscriber identity module (SIM) interface, a universal asynchronous receiver/transmitter (UART) interface, a pulse width modulation (PWM) interface, a secure digital memory card (SDMC) interface, an inter-integrated Circuit (I2C) bus interface, a keyboard interface, and a general purpose input/output (GPIO) interface.

It is to be noted that the data generated after processing by the CPU and the DSP may be directly used by a user program of the system, or may be output to a host computer through at least one of the interfaces mentioned above.

In a first aspect, the present disclosure provides a communication chip, which is applied to a terminal device and includes a system control module, a radio frequency signal processing module, a first baseband processing module, and a second baseband processing module, where,
  the system control module is respectively connected to the radio frequency signal processing module, the first baseband processing module and the second baseband processing module; and
  the radio frequency signal processing module is further respectively connected to the first baseband processing module and the second baseband processing module.

In a possible design, the system control module includes: a processor, a storage module, and a control bus, where,
  the processor and the storage module are respectively connected to the control bus, and the control bus is further respectively connected to the radio frequency signal processing module, the first baseband processing module and the second baseband processing module.

In a possible design, the storage module includes at least one of:
  a static random access memory, an external non-volatile memory, and a pseudo static random access memory.

In a possible design, the radio frequency signal processing module includes an analog signal processing module, a digital signal processing module, and a radio frequency interface, where,
  the analog signal processing module is connected to the digital signal processing module; and
  the radio frequency interface is respectively connected to the digital signal processing module, the system control module, the first baseband processing module and the second baseband processing module.

In a possible design, the first baseband processing module includes a first baseband signal processing module, a first timing controller, and a first low-power synchronizer, where,
  the first baseband signal processing module is respectively connected to the system control module, the radio frequency signal processing module, and the first timing controller; and
  the first timing controller is further connected to the first low-power synchronizer.

In a possible design, the second baseband processing module includes a second baseband signal processing module, a second timing controller, and a second low-power synchronizer, where,
  the second baseband signal processing module is respectively connected to the system control module, the radio frequency signal processing module and the second timing controller; and
  the second timing controller is further connected to the second low-power synchronizer.

In a possible design, the communication chip further includes an external interface module, where,
  the external interface module is connected to the system control module.

In a possible design, the external interface module includes at least one of:
  a serial peripheral interface, a subscriber identity module interface, a universal asynchronous receiver/transmitter interface, a pulse width modulation interface, a secure digital memory card interface, an inter-integrated circuit, a keypad interface, and a general-purpose input/output interface.

In a possible design, the first baseband processing module is a narrow band internet of things baseband processing module, and the second baseband processing module is a Global System for mobile communication baseband processing module.

In a possible design, the radio frequency signal processing module is further connected to an antenna in the terminal device, and the number of the antenna is one.

Finally, it is to be noted that: the above-mentioned embodiments are merely used for illustrating the technical solutions of the present disclosure, rather than limiting them. Although the present disclosure has been described in detail with reference to the foregoing embodiments, those of ordinary skill in the art will appreciate that the technical solutions disclosed in the above-mentioned embodiments may still be amended, or some or all of the technical features thereof may be replaced by equivalents, and such modifications and substitutions do not make the essence of the corresponding technical solutions separate from the scope of technical solutions of the embodiments of the present disclosure.

The invention claimed is:

1. A communication chip, applied to a terminal device, comprising: a system control module, a radio frequency signal processing module, a first baseband processing module, and a second baseband processing module, wherein,
the system control module is respectively connected to the radio frequency signal processing module, the first baseband processing module and the second baseband processing module; and
the radio frequency signal processing module is further respectively connected to the first baseband processing module and the second baseband processing module;
wherein the first baseband processing module comprises: a first baseband signal processing module, a first timing controller, and a first low-power synchronizer, wherein,
the first baseband signal processing module is respectively connected to the system control module, the radio frequency signal processing module, and the first timing controller; and
the first timing controller is further connected to the first low-power synchronizer.

2. The communication chip according to claim 1, wherein the system control module comprises: a processor, a storage module, and a control bus, wherein,
the processor and the storage module are respectively connected to the control bus, and the control bus is further respectively connected to the radio frequency signal processing module, the first baseband processing module and the second baseband processing module.

3. The communication chip according to claim 2, wherein the storage module comprises at least one of:
a static random access memory, an external non-volatile memory, and a pseudo static random access memory.

4. The communication chip according to claim 1, wherein the radio frequency signal processing module comprises: an analog signal processing module, a digital signal processing module, and a radio frequency interface, wherein,
the analog signal processing module is connected to the digital signal processing module; and
the radio frequency interface is respectively connected to the digital signal processing module, the system control module, the first baseband processing module and the second baseband processing module.

5. The communication chip according to claim 4, wherein the analog signal processing module comprises: a receiving module, a first transmitting module corresponding to a global system for mobile communications (GSM) communication mode, and a second transmitting module corresponding to a narrow band internet of things (NB-IoT) communication mode.

6. The communication chip according to claim 5, wherein the receiving module comprises: low-noise amplifiers, a receiving-end multiplier, a frequency divider, programmable gain amplifiers, receiving-end filters, and analog-to-digital converters.

7. The communication chip according to claim 5, wherein the receiving module is used in the GSM communication mode and the NB-IoT communication mode.

8. The communication chip according to claim 5, wherein the first transmitting module corresponding to the GSM communication mode comprises: driver amplifiers, a radio frequency phase locked loop, and an oscillator.

9. The communication chip according to claim 8, wherein the oscillator is configured to generate a clock signal having a clock frequency of 26 mega.

10. The communication chip according to claim 5, wherein the second transmitting module corresponding to the NB-IoT communication mode comprises: driver amplifiers, a transmitting-end multiplier, transmitting-end filters, and digital-to-analog converters.

11. The communication chip according to claim 5, wherein the analog signal processing module further comprises: a GSM baseband phase locked loop and a narrow band (NB) baseband phase locked loop.

12. The communication chip according to claim 5, wherein a GSM baseband phase locked loop is configured to provide a clock for the second baseband processing module, and a narrow band (NB) baseband phase locked loop is configured to provide a clock the first baseband processing module.

13. The communication chip according to claim 1, wherein the second baseband processing module comprises: a second baseband signal processing module, a second timing controller, and a second low-power synchronizer, wherein,
the second baseband signal processing module is respectively connected to the system control module, the radio frequency signal processing module and the second timing controller; and
the second timing controller is further connected to the second low-power synchronizer.

14. The communication chip according to claim 1, wherein the communication chip further comprises: an external interface module, wherein,
the external interface module is connected to the system control module.

15. The communication chip according to claim 14, wherein the external interface module comprises at least one of:
a serial peripheral interface, a subscriber identity module interface, a universal asynchronous receiver/transmitter interface, a pulse width modulation interface, a secure digital memory card interface, an inter-integrated circuit bus interface, a keypad interface, and a general-purpose input/output interface.

16. The communication chip according to claim 1, wherein the first baseband processing module is a narrow band internet of things baseband processing module, and the second baseband processing module is a global system for mobile communication baseband processing module.

17. The communication chip according to claim 16, wherein the radio frequency signal processing module is further connected to an antenna of the terminal device, and the number of the antenna is one.

* * * * *